United States Patent
Bruun et al.

(10) Patent No.: US 12,093,280 B2
(45) Date of Patent: Sep. 17, 2024

(54) MULTI-GEOGRAPHY ORCHESTRATION

(71) Applicant: HEWLETT PACKARD ENTERPRISE DEVELOPMENT LP, Spring, TX (US)

(72) Inventors: Peter Michael Bruun, Alleroed (DK); Jane Koenigsfeldt, Alleroed (DK); Jens Vedel Markussen, Alleroed (DK)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/982,737

(22) Filed: Nov. 8, 2022

(65) Prior Publication Data
US 2024/0152529 A1    May 9, 2024

(51) Int. Cl.
G06F 16/00    (2019.01)
G06F 16/27    (2019.01)
G06F 16/29    (2019.01)

(52) U.S. Cl.
CPC .............. *G06F 16/27* (2019.01); *G06F 16/29* (2019.01)

(58) Field of Classification Search
None
See application file for complete search history.

(56) References Cited

U.S. PATENT DOCUMENTS

| | | | |
|---|---|---|---|
| 7,003,587 B1 | 2/2006 | Battat et al. | |
| 7,680,879 B2 | 3/2010 | Battat et al. | |
| 8,510,304 B1 | 8/2013 | Briggs et al. | |
| 8,555,016 B2 | 10/2013 | Adl-Tabatabai et al. | |
| 8,768,902 B2 | 7/2014 | Aitken et al. | |
| 8,843,441 B1* | 9/2014 | Rath | G06F 16/182 707/614 |
| 8,930,312 B1* | 1/2015 | Rath | G06F 16/278 707/634 |
| 10,025,710 B2 | 7/2018 | Sardina et al. | |
| 11,630,845 B2* | 4/2023 | Dageville | G06F 16/245 707/615 |
| 11,681,684 B2* | 6/2023 | Lee | G06F 16/28 707/703 |
| 2005/0091342 A1 | 4/2005 | Frey et al. | |
| 2006/0136454 A1 | 6/2006 | Tchouati et al. | |
| 2015/0046395 A1* | 2/2015 | Rath | G06F 16/27 707/623 |
| 2015/0120658 A1* | 4/2015 | Rath | G06F 16/27 707/623 |

(Continued)

FOREIGN PATENT DOCUMENTS

WO    03/81464 A2    10/2003

OTHER PUBLICATIONS

"Apache Kafka", available online at < https://kafka.apache.org>, Nov. 2021, 4 Pgs.

(Continued)

*Primary Examiner* — Farhan M Syed
(74) *Attorney, Agent, or Firm* — Sheppard Mullin Richter & Hampton LLP

(57) ABSTRACT

An orchestration cluster node system may include a plurality of local orchestration cluster nodes. Each local cluster node may include a service request executor, coordination function, and a resource manager. Each local cluster node may operate in a geography and the coordination functions of local cluster codes may communicate to coordinate execution of services across geographies.

20 Claims, 7 Drawing Sheets

(56) References Cited

U.S. PATENT DOCUMENTS

| | | | | |
|---|---|---|---|---|
| 2018/0260125 A1* | 9/2018 | Botes | .................. | G06F 11/2094 |
| 2021/0019093 A1* | 1/2021 | Karr | ...................... | G06F 3/0608 |
| 2021/0019237 A1* | 1/2021 | Karr | ...................... | G06F 3/0647 |
| 2021/0075877 A1 | 3/2021 | Miedema et al. | | |
| 2021/0373761 A1* | 12/2021 | Karr | ...................... | G06F 3/0614 |
| 2022/0019367 A1* | 1/2022 | Freilich | ................... | G06F 3/067 |
| 2022/0019385 A1* | 1/2022 | Karr | ...................... | G06F 3/0664 |
| 2023/0004330 A1* | 1/2023 | Frandzel | ............... | G06F 3/0631 |
| 2023/0195444 A1* | 6/2023 | Vohra | ...................... | G06F 9/455 |
| | | | | 717/172 |

OTHER PUBLICATIONS

"Bi-Directional Replication (BDR)", Enterprise DB, available online at <https://www.enterprisedb.com/doc/bdr/latest>, Sep. 2021, 4 Pgs.

"TOSCA Simple Profile in YAML Version 1.3", Oasis, available online at <https://docs.oasis-open.org>, Sep. 2019, 3 Pgs.

Oracle, "Java Message Service", available online at <https://www.oracle.com/java/technologies/java-message-service.html>, Nov. 2021, 1 Pg.

Oracle, "Real Applications Clusters", available online at <https://www.oracle.com/database/real-application-clusters>, Nov. 2021, 7 Pgs.

\* cited by examiner

MULTI-GEOGRAPHY ORCHESTRATION

BACKGROUND

Orchestration refers to rule-driven and automated configuration, management, and coordination of computer systems and software. These computer systems, comprising computing resources, including computing, networking, applications and services, may be altered based on the rules associated with a computer-implemented orchestration process. Since some computer systems and groups of software are so large, orchestration may involve combining multiple tasks to execute a larger workflow or process more efficiently than if the tasks were completed individually without reference to each other. When some of these tasks are mutually conflicting, orchestration may involve coordinating tasks and/or processes across multiple systems.

Within the context of orchestration, "scaling" refers to expanding or reducing an existing orchestration to handle a larger number of requests and/or to handle requests spanning multiple other systems beyond the original system. Within the context of scaling, the orchestration can be "scaled up" or "scaled out." Scaling up can refer to adding compute power within a compute node, which can correspond with adding more CPU, RAM, etc. on the executing computer (e.g., physical or virtual computer). Scaling out can refer to adding compute nodes that share the load at a local- or wider-geographical level. For example, scaling up may be limited by the available technology of the day, while scaling out may be limited by the ability to federate the tasks at hand and to provide fast, low-latency networking between the involved compute nodes.

Scaling out may further be referred to in terms of a "local scale out" or a wider "geographical scale out." In a local scale out, scale out nodes may be located within a close enough proximity to guarantee negligible network latency and high bandwidth. In a geographical scale out, network latency may not be negligible due to the potentially large distance between scale out nodes. To accommodate this, the orchestrator may avoid assumptions about the latency or bandwidth availability of the compute nodes, and improve the performance of the resulting, scaled out system without changing networking properties.

BRIEF DESCRIPTION OF THE DRAWINGS

The present disclosure, in accordance with one or more various examples, is described in detail with reference to the following figures. The figures are provided for purposes of illustration only and merely depict typical or exemplary examples.

Figure 1:
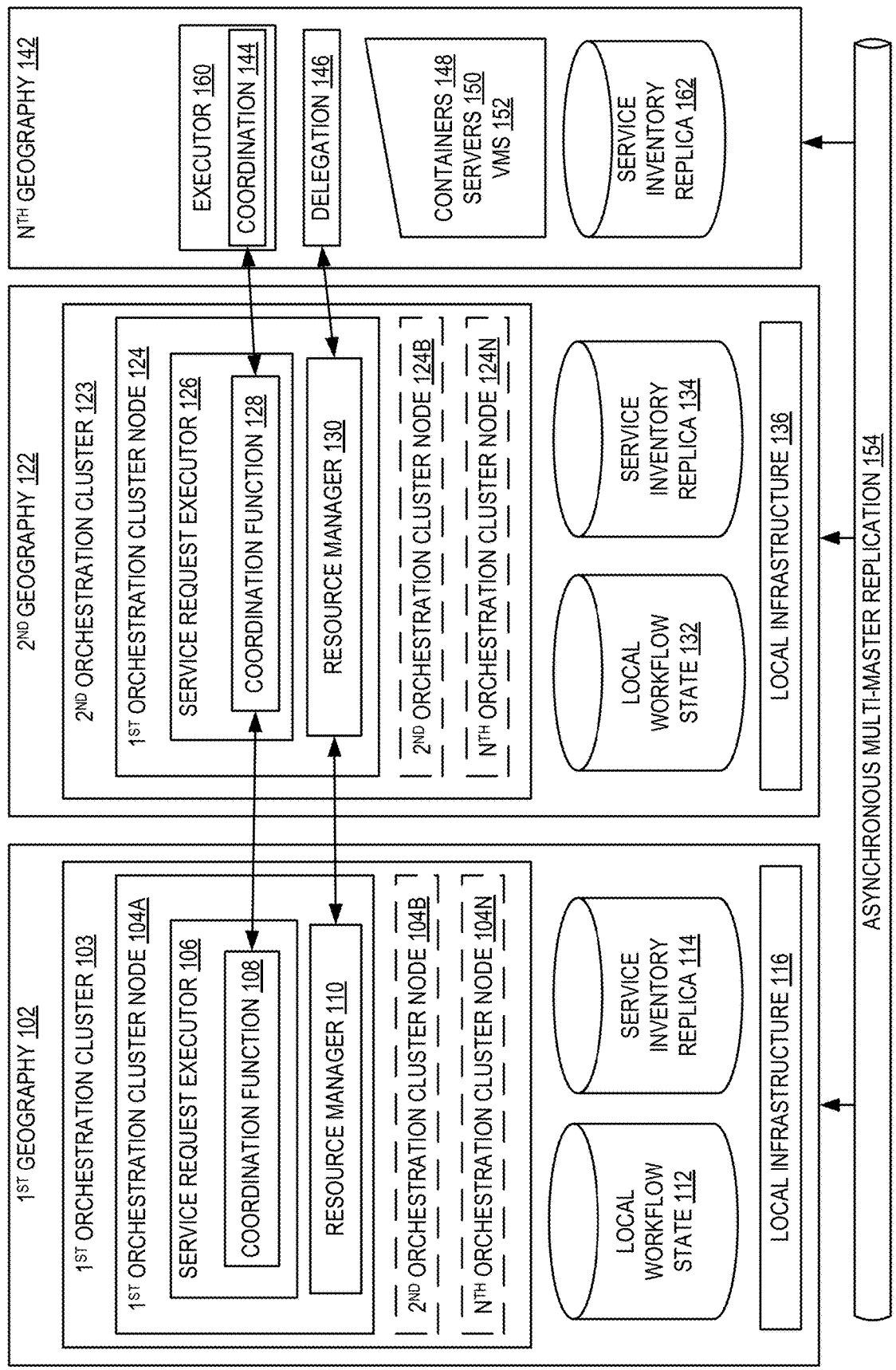
FIG. 1 is a diagram showing an example of an architecture for an orchestration cluster node system that orchestrates services across multiple geographies, in accordance with the examples disclosed herein.

The figures are not exhaustive and do not limit the present disclosure to the precise form disclosed.

DETAILED DESCRIPTION

Systems and methods disclosed herein relate to an orchestration cluster node system that analyzes usage-patterns between clusters at different geographies. Each cluster may comprise one or more cluster nodes. Each cluster node may comprise an executor and its corresponding database. The analysis of the usage patterns between clusters may help coordinate processes that are implemented by the cluster nodes within the orchestration cluster node system to help improve efficiency of the overall orchestration cluster node system.

The orchestration cluster node system may scale out the operability of the orchestration process by handling a greater number of transactions across a greater number of geographies than traditional systems. The orchestration cluster node system may deliver improved scale-out capabilities while preserving the autonomy, high-volume achievement, and distributed orchestration of one or more of the cluster nodes in the orchestration cluster node system. The orchestration cluster node system may also offer disaster recovery features in case of disruptions to communication networks located in multiple geographies. The orchestration cluster node system may reduce processing and execution time for complex request executions (e.g., from hours to minutes).

In some examples, the orchestration cluster node system may improve coordination of processes performed by the cluster nodes in distributed geographies through one or more processes, including instructing the local cluster nodes to generate high volumes of concurrent data, implementing transactional guarantees for data across geographies, and implementing rule-based processes to lower network latency from other operational measurements (e.g., on or below about 5 milliseconds).

No known orchestration system with database technologies currently implement these improved processes. For example, traditional systems may attempt to reduce latency by using different methods. One method of lowering latency across distributed geographies may be to reduce the rate of transmitting "update commands" on the database, which can update the database at a slower rate than before. With fewer update commands transmitted in association with the database (e.g., resulting from the slower rate of transmission), the latency is also reduced because fewer data packets (e.g., update commands) are transmitted in the communication network. In another example, latency may be reduced when fewer data checks are implemented. The reduced number of data checks performed by the processor of the database may also reduce the number of data packets (e.g., read/write commands) that are being transmitted in the communication channel, but this change may also compromise transactional consistency.

The examples disclosed herein propose an orchestration cluster node system that implements one or more processes to improve coordination of processes performed by the cluster nodes in distributed geographies. These and other processes may help bring down processing time (e.g., for orchestration commands in the form of transactions, etc.) from hours to minutes and improve scalability of the orchestration cluster node system overall.

In comparison, traditional systems do not operate on recently or concurrently modified services (e.g., synchronously or asynchronously, as described throughout the disclosure) and the hardware to implement the orchestration system does not span throughout distributed geographies. In these traditional systems, the services provided by the orchestration system may be associated with a Location of Record ("LoR") identifier or geography. The coordination function implemented by these LoR systems may update services and processing performed by the system at one location at a time by relying on an orchestration executor (or an "orchestrator," used interchangeably). The orchestrator may process any requests for its LoR identifier and synchronize the changes with other services. Requests may be processed based on optimistically read data.

In some examples, an impact model may be generated to reflect changes to the system while a coordination function (e.g., concurrently, sequentially, etc.) locates each LoR identifier and ensures synchronization at the single geography location. After the impact model is complete, services that are in a pipeline to be modified may be confirmed (e.g., against the ordered list of updates) and locked (or otherwise held on a lock) for a future update process.

In some examples, locking or holding a lock on data or services means that one thread in one cluster node at one geography may modify the data at a time. If a second process of the plurality of processes attempts to lock data that a first process already holds a lock on, then the second process will wait until the first process releases the lock. When the first process releases the lock, the second process holds the lock and proceeds. If both the second process and a third process of the plurality of processes are waiting for a lock that the first process holds, then a decision may be made as to the execution order of the second or third process. For example, the decision of whether the second process or the third process first holds the lock and proceeds may depend on a policy or other predetermined rule of the locking system. If a process reads data without holding a lock, the data could potentially be updated by a plurality of processes, leading to errors in the processing performed by the plurality of processes. If data is updated by a plurality of processes, a first process executing machine readable instructions that access the data might not be up-to-date with data written by a second process. In this instance, the operations implemented by the first process on the data may yield results that are erroneous compared to results generated by operating on the latest data written by the second process. Furthermore, if the first process stores the data that are not up-to-date, the first process may overwrite the data written by the second process, leading to the error of losing the data written by the second process.

One way to guarantee that such errors do not occur is if the plurality of processes lock the data before reading or writing the data. A second way is to use a computer-implemented process called an "optimistic locking" process. With optimistic locking, a first process in a plurality of processes that has read data from a memory (e.g., persistent storage) can determine if that data is "dirty." Dirty data refers to a scenario in which data was most recently read by a process at a time prior to a time when currently persisted data was written. In an optimistic locking process example, the first process creates, deletes, or modifies unlocked data. The first process persists until such a time where the first process writes the data. At the time when the first process writes the data, the first process also locks the data. After the first process locks the data, the first process (or separate processor or controller device) checks if the data is dirty. If the data is not dirty, results of operations performed on the data are correct. In other words, the data that is written after being locked and is therefore not dirty. If the process determines that the data is dirty, then the first process reads the data again. This time, the first process holds the lock, and this may guarantee that the data is also not dirty. When all processes in the plurality of processes use optimistic locking as described, then no second process in the plurality of processes can write unlocked or dirty data.

A deadlock may occur if there is a circularity among the plurality of processes that are both holding and waiting for a plurality of locks. For example, a deadlock may occur when: (1) a first process holds a lock and a second process waits for the lock that the first process holds, and concurrently (2) the second process holds a lock and the first process waits for the lock that the second process holds. In this deadlock scenario, both the first and second processes wait. Because both processes wait, neither process may persist to a point at which it may release the lock that it holds.

Deadlocks, such as the example described herein, may be detected by a processor and software combination that manages locks (e.g., by an orchestration cluster node executor of the orchestration cluster node system). If a deadlock occurs, the oldest process may be given the locks to the data and the oldest process may be allowed to progress first. Then, the executor may access the data and determine whether dirty data exists. If the dirty data is found, the executor may re-execute the impact model. If no dirty data is found, the orchestration process may be executed by delegating actions for services in respective LoRs. The impact model approach may allow the orchestration cluster node system to predict which data will be modified, created, and/or deleted before the data is in actuality created, modified, or deleted.

As referred to herein, "locking data" means that an identifier associated with the data is locked and the corresponding data is not changeable for a period of time. Many types of unique identification can be used for locking. For example, a "surrogate identification" refers to identification of an object in the database using a unique identifier (e.g., the surrogate identifier). A surrogate identifier may not be derived from the data itself. Rather, the surrogate identifier acts as a substitute for the data. Surrogate identifiers may be used for locking after the data is persisted the first time. The surrogate identifiers may be different if data were deleted and written again, since the surrogate identifiers may not be derived from the data itself. A disk address of the stored data or a database sequence number would, for example, constitute surrogate identification using one or more surrogate identifiers.

In another example, "semantic identification" may also be used for locking. Semantic identification determines and incorporates properties of the data itself. Therefore, semantic identification can reflect a property or role of the data that can be determined even before the data is first persisted. A semantic identifier would be the same if the data were deleted and created again. If a locking system using semantic identification for data is applied, first and second processes of a plurality of processes can independently lock the data for that identification, even before the data is persisted the first time.

In another example, a tree-structured locking process may be implemented. The tree-structured locking process may incorporate semantically identified data for services and can help prevent bottlenecking with too many coordination requests. Since services are structured in a tree-structured hierarchy, semantic identification can be partially derived from the position of the service in the tree, known as the "path to the service," and partially from a semantic identification of the individual service. If a service is locked, at some point down the hierarchical tree, one or more of its child-services may also be locked. This may reduce the number of individual locking actions involved. Therefore, two different processes could run on two different parts of the tree-structured hierarchy since the child services are locked past a certain point.

Scale-Out Example

Providing effective, reliable, and fast network services may involve management of thousands of complex, concurrent transactions per second. Network services may include hybrid, distributed information technology (IT), data transmission processes described in network documentation (e.g., 5G slicing), or other features like data processing with distributed devices (e.g., edge computing). Using these and other network services, the processing capabilities and transactions implemented in the network may span vast geographies. Desired network orchestration characteristics may include unlimited horizontal scale-out of service orchestration solutions while maintaining local orchestrator autonomy. Disaster recovery solutions in case of major disruption of sites or networks may also be desired.

Some orchestrators may be communicatively coupled to their database. This coupling may limit the ability of the orchestrator to interact with other capabilities of the system, including identifying deployed service states and on-going orchestration processes. In some examples, the scale-out process may include expanding the capabilities of the database and processes interacting with the database to help improve the scale-out process overall, which may help achieve these desired characteristics. Orchestrators may perform local installations autonomously with regional level and/or cluster-level scale-out and active-passive disaster recovery. However, to perform a scale-out process, a system may account for the fact that end-to-end services span multiple, physical geographies. Traditional systems may attempt to solve the latency delays and load balancing issues introduced in the scale-out process by implementing northbound requests. Northbound requests may include requests from lower-level components to higher level components. Because services span geographies, services cannot be handled by an individual local orchestrator alone.

In some examples, the orchestration cluster node system improves communications between its components that span multiple geographies. In each geography, the orchestration cluster node system may maintain local, autonomous orchestration cluster nodes that may be communicably coupled to local databases. The orchestration cluster node system may allow for coordination among system components in multiple geographies to help prevent issues stemming from out-of-date data. The orchestration cluster node system, as described herein, may be a federated orchestration model of loosely coupled collective autonomous parts of the system, including orchestration cluster nodes and databases that are local to each geography. Local orchestration cluster nodes may act as a unified platform in response to a request. A federated orchestration model may be configured to achieve strong coordination and replication.

FIG. 1 is a diagram showing an example of an architecture for an orchestration cluster node system that orchestrates services across multiple geographies, in accordance with the examples disclosed herein. As described herein, a geography is a local area in which the orchestration cluster node system maintains local, autonomous orchestration cluster nodes.

As shown in FIG. 1, multiple geographies are provided, including first geography 102, second geography 122, and Nth geographies 142 (illustrating multiple, non-limiting additional geographies). In one or more of the geographies illustrated, the geography may comprise a cluster of cluster nodes. For example, first geography 102 may comprise a first orchestration cluster 103 with one or more orchestration cluster nodes 104, illustrated as first orchestration cluster node 104A, second orchestration cluster node 104B, and Nth orchestration cluster node 104N. Second geography 122 may also comprise a cluster, illustrated as second orchestration cluster 123 with one or more orchestration cluster nodes 124. Cluster nodes 124 within cluster 123 at second geography 122 are illustrated as first orchestration cluster node 124A, second orchestration cluster node 124B, and Nth orchestration cluster node 124N. Orchestration cluster nodes may be containers configured to carry out and coordinate requests with a local geography. As shown in FIG. 1, orchestration cluster nodes 104 may handle services within first geography 102. Orchestration cluster nodes 104 in first geography 102 may also coordinate with orchestration cluster nodes in other geographies. Each cluster node 104 may run in a container, physical server, and/or virtual machine.

First geography 102 may also include a local workflow state 112, a service inventory replica 114, and local infrastructure 116. A local workflow state 112 may be a persisted representation of a previously executed portion or portions of a workflow and any values associated with the nodes in which the workflow was executed. The workflow state may help in identifying executed portions of the workflow for its geography. For example, the workflow state may be stored in a persisted data store representing the executed portions of the workflow. If first orchestration cluster node 104 terminates, either intentionally or unexpectedly while executing a workflow, a workflow state may allow other cluster nodes (e.g., second orchestration cluster node 124) to read the workflow state from a persistent store and resume execution of the workflow.

A service inventory replica 114 may provide low latency database access by storing a local copy of the list of services executed at first geography 102 by first orchestration cluster node 104. By placing service inventory replica 114 within a physical proximity of the first orchestration cluster node 104 (e.g., within a threshold distance defined as the first geography 102), the transmission times may be reduced by physically reducing the distance that data packets may travel in the communication network. In some examples, the list of services stored at the service inventory replica 114 may help provide access to the list of services for other components of orchestration cluster node system. In some examples, the list of services may be copied from a central database (e.g., located at another geography 122, 142 of the orchestration cluster node system).

First orchestration cluster node 104 may comprise a service request executor 106 and a resource manager 110, and second orchestration cluster node 124 may comprise a service request executor 126 and a resource manager 130. Each of service request executor 106 and service request executor 126 may include a coordination function 108 and coordination function 128, respectively. For example, service request executor 106 may execute desired service changes such as modification, creation, and deletion of services. Additional functions and operations implemented by service request executor 106 are discussed in more detail below and with reference to FIGS. 2 and 3. Resource manager 110 may execute orchestration activations and may maintain low level synchronization by delegating actions for services to their respective LoRs. Low level synchronization refers to synchronization within a geography, as opposed to synchronization across geographies. Coordination function 108, 128 may be located at each LoR or geography (e.g., first geography 102 and second geography 122). Coordination function 108, 128 at an LoR/geography may ensure that one location at a time updates the service.

Second geography 122 may include orchestration cluster nodes 124. In some examples, orchestration cluster nodes 124 in second geography 122 may be local orchestration modules. Orchestration cluster nodes 14 may handle services within the second geography 122. Orchestration cluster nodes 124 in the second geography 122 may also coordinate with orchestration cluster nodes in other geographies, such as the orchestration cluster node in first geography 102. The second geography 122 may also include local workflow state 132, service inventory replica 134, and local infrastructure 136. Local workflow state 132 may maintain status indicators for services in second geography 122. Service inventory replica 134 may provide low latency database access. Orchestration cluster nodes 124 may include service request executor 126, and resource manager 130. Service request executor 126 may further include coordination function 128.

Figure 2:
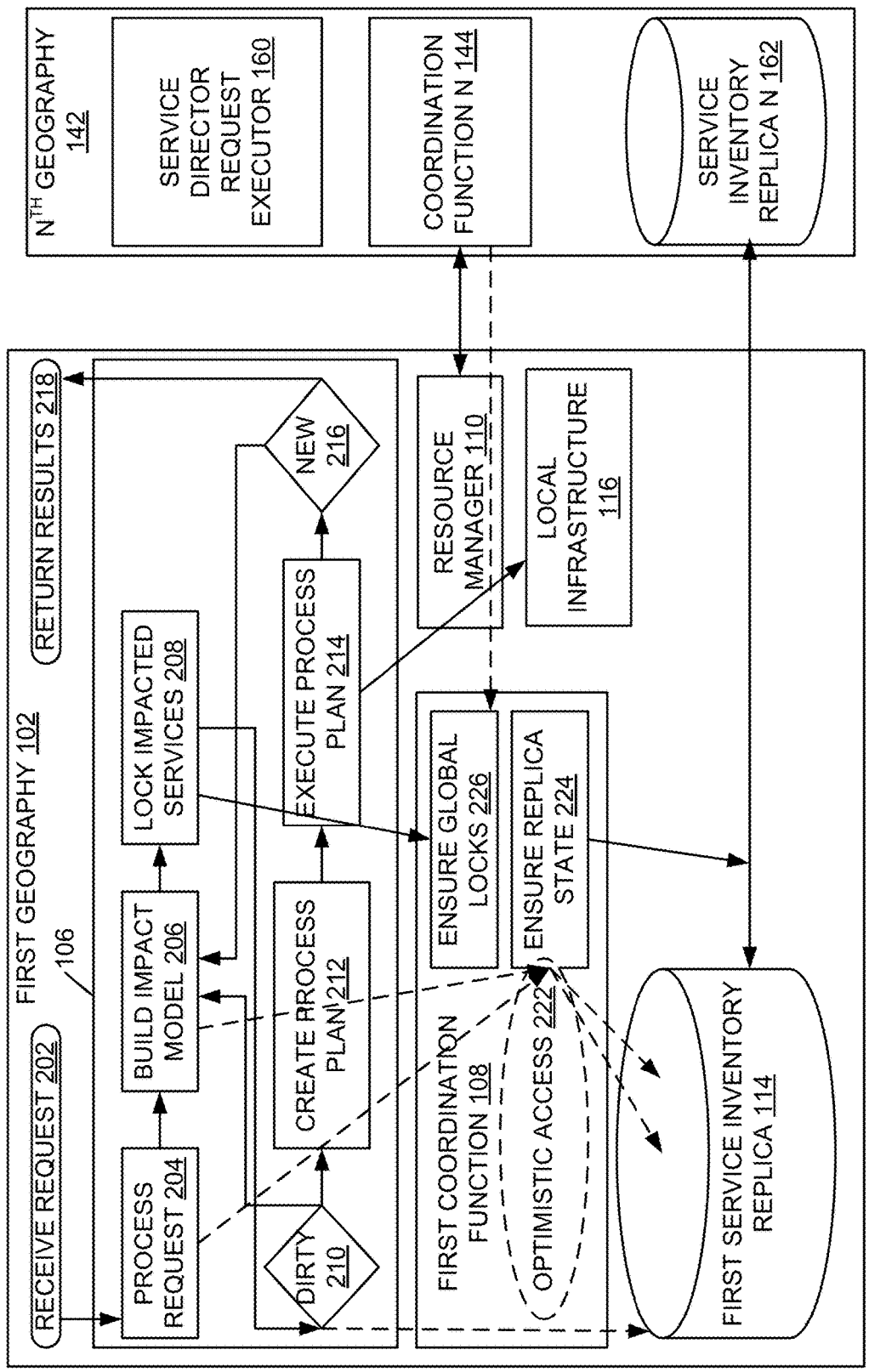
FIG. 2 is a diagram showing an example of a request processing solution for a request to create, modify, and/or delete a service topology by the orchestration cluster node system, in accordance with the examples disclosed herein.

The components described herein are described with reference to first geography 102 and second geography 122. However, any number of geographies, "n", may include similar components and may coordinate amongst themselves. FIG. 2 also shows Nth geography 142.

Coordination functions at different LoRs may be referred to as remote coordination functions. These coordination functions may communicate to coordinate requests spanning geographies. For example, at first geography 102, the service request executor 106 or the coordinating function 108 may be configured to transmit one or more coordination requests to each other (e.g., within first geography 102) that request information about modifications to services spanning other geographies (e.g., within second geography 122 or Nth geography 142). Coordination function 108 at first geography 102 may be remote from coordination function 128 at second geography 122 and coordination function 144 at Nth geography 142.

Nth geography 142 may include service request executor 160 (e.g., to execute desired service changes such as modification, creation, and deletion of services) with coordination function 144 and delegation function 146. Coordination function 144 and delegation function 146 of Nth geography 142 may communicate with the coordination function and resource manager of orchestration cluster nodes of other geographies. For example, coordination function 144 and delegation function 146 may communicate with coordination function 128 and resource manager 130 of orchestration cluster node 124 of second geography 122. Coordination functions at different LoRs may be referred to as remote coordination functions. These coordination functions may communicate to coordinate requests spanning geographies. Nth geography 142 may also include containers 148, servers 150, and virtual machines 152. A cluster node of the Nth geography may run in container 148, server 150, and/or virtual machine 152. Service inventory replicas 114, 134 of the first and second geographies, respectively, may communicate with asynchronous multi-conductor replication 154 (e.g., to ensure accuracy of records at each geography), and service inventory replica 162 of Nth geography 142.

Request Processing Example

The orchestration cluster node system may be implemented as a federated orchestration model. The federated orchestration model may help execute services or other processes by one or more orchestration cluster nodes while executing requests, services, or orchestration processes with a low latency between a processor and a database corresponding to the processor. Low latency may have different meanings in different contexts, and the meaning may be adjusted depending on which requests, services, or orchestration processes are being implemented at the geography. For example, low latency may mean less than five milliseconds in the context of an unlimited scale out orchestration cluster node system. Several characteristics, implemented synchronously or asynchronously, may support fast, reliable, and correct creation of services.

For example, for a federated orchestration model to create services fast, the orchestration cluster node system may include one or more databases configured to support local orchestration cluster nodes. The local orchestration cluster nodes may create a plurality (e.g., high volumes) of concurrent database reads and writes. In another example, the databases may also provide full read-committed transaction guarantees of the data stored in the databases across geographies. Providing the guarantees may help implement fast and reliable creation of services by the orchestration cluster node system. In another example, the orchestration cluster node system may execute requests, services, or orchestration processes at a low latency between the processor and the database corresponding to the processor. Each orchestration cluster node may run in a container, a virtual machine, or on a physical server. The latency between the processor and corresponding database may be low. For example, the latency between the processor and corresponding database may be at or less than five milliseconds. Operating at a low latency may also support fast, reliable, and accurate creation of services.

The foregoing characteristics may appear to be contradictory. For instance, maintaining a latency below five milliseconds across a large geography may not be possible unless either update rates are low or transactional consistency is compromised. Despite the seemingly contradictory nature of these characteristics, the orchestration cluster node system may implement a request processing solution, as described herein with reference to FIG. 2. For example, the orchestration cluster node system may leverage the fact that these characteristics may be maintained by a majority of transactions but not necessarily every single transaction. A small number of transactions may, for example, take longer than five milliseconds, exceeding the latency criterion. However, the orchestration cluster node system may still operate effectively if a majority of transactions operate with low latency (e.g., about 98% of services or greater operate within the latency criterion, network and local communications are within the parameters described herein, etc.). In another example, a majority of transactions may not operate on services that were recently modified or are concurrently being modified by other transactions. In yet another example, a majority of transactions may not span geographies (e.g., about 90% of transactions).

To help reduce the effect of the transactions that cause latency in the system overall, the orchestration cluster node system may implement one or more processes described herein, including implementing a request processing solution or defining local pools of Internet Protocol (IP) addresses. The local pools of IP addresses may help configure the orchestration cluster node system such that a majority of transactions do not span multiple geographies.

FIG. 2 is a diagram showing an example of a request processing solution for a request to create, modify, and/or delete a service topology by the orchestration cluster node system, in accordance with the examples disclosed herein. In this illustration, first geography 102 and Nth geography 142 from FIG. 1 are shown with respect to executing requests, services, or orchestration processes. Other components of FIG. 1 may help execute several processes illustrated in FIG. 2, including requests to create, modify, or delete service topologies.

In this example, first geography 102 may receive a request 202 at request executor 106 (e.g., from a requestor device). The request executor 106 may process the received request 204. The request executor 106 may instruct an engine to build an impact model 206. The request executor 106 may lock impacted services 208. The request executor 106 may check for dirty data 210. If dirty data is detected, the request executor 106 may build a second impact model 206, starting the process over from this operation. If no dirty data is detected, the request executor 106 may create a process plan 212. The request executor 106 may execute the process plan 214. The request executor 106 may then check for new information affecting the process plan 216. If new information affecting the process plan is received, the request executor 106 may build a third impact model 206 and start the process over from this operation. If no new information affecting the process plan is received, the request executor 106 may return results 218 (e.g., to the requestor device), including resulting service data or functions generated by the process plan.

The coordination function 108 at first geography 102 and the coordination function 144 at Nth geography 142 may communicate with the request executor 106 to help coordinate the implementation of the process model and communications between the geographies.

In some examples, the flow of FIG. 2 occurs in one cluster, may jump between nodes in the cluster, and may comprise different services that belong to different LoRs (e.g., geographies). As such, the flow may ensure that the process is based on a consolidated and consistent view of those services in the local replica. This is done by initially and "optimistically" assuming that the local replica happens to have correct information about services belonging to other LoRs, but then in the locking phase 208 to check if that assumption was true. If yes, then the process is correct and can continue, if no (illustrated as dirty 210), then wait for obtaining locks from those other LoRs (at block 226). When the process is ready to continue, the local replica correctly represents the information from the remote LoR service inventory replicas concerning those services. The process may repeat the building of impact model 206 on the now consistent data in the local replica. It may, however, happen that the new model produced by block 206 introduces new services not previously locked. In this case, the process may again optimistically assume correct data in the local repository. If the data is not correct, the process may repeat blocks 206-210 until there are no more dirty services.

Synchronous and asynchronous processes may help identify a portion of the processes that are performed concurrently or not. For example, if an action A starts an action B, asynchronously, action A may start with action B, but does not wait for action B to complete. So action B will continue concurrently with action A. Later, action may need the result of action B. If it does, it may not have to wait for the result of action B, if action B is not, at that point in the execution of action A, ready with a result. In another example, if an action A starts action B, synchronously, it means that action A waits for action B to complete and then continues. So action A and action B may not happen concurrently. In this example, a synchronous action can be realized by an asynchronous action followed by a wait. In some examples, an action that is synchronous may also have an underlying asynchronous mechanism realizing it.

In view of the lock-ensure process discussed herein, lock impacted services (at block 208) and dirty (at block 210) may be synchronous with or part of the elaborate process. When the lock-ensure process (at block 226) uses the result of block 224, the process can include a "wait" process with block 224 if it is not yet ready.

In some examples, coordination function 108 may provide access 222 to one or more databases based on an optimistic read of the request and data affected by the request throughout the execution process. In some examples, access to the service inventory replica may be provided using optimistic access 222 (e.g., as a naming of the type of interaction between process request 204 and first service inventory replica 114, and also naming the type of interaction between build impact model 206 and first service inventory replica 114). During these interactions, the process may ensure replica state 224. This may allow optimistic access 222 to transparently and concurrently initiate replication while other processes or functions are executing, including process request 204 and build impact model 206.

Combination of synchronous and asynchronous processes may occur. For example, operations that perform an optimistic access 222 of the system, including the dotted lines between request service executor 106 and service inventory replica 114, may be synchronous, while the initiation of ensure replica state 224 may be asynchronous. In some examples, the elaborate-provide process is synchronous while the elaborate-determine is asynchronous, which can help the LoRs be consulted and synchronized concurrently while 204-206 continue.

In some examples, the access from the process for dirty data (at block 210) to first service inventory replica 114 may not correspond with an optimistic access 222. Rather, the interaction between dirty (at block 210) and first service inventory replica 114 may correspond with a direct access to the newly replicated information post-locking, for example, to check if the previously optimistically read information was correct or "dirty."

In another example, coordination function 108 may also ensure global locks 226, among geographies, during operation 208, when the request executor 106 is locking impacted services.

In another example, coordination function 108 may also ensure a replica state 224 by initiating a state replication process. For example, ensuring a replica state 224 may involve confirming that service inventory replicas 114, 162 in different geographies have correct and up-to-date information. Checking the service inventory replica 114 may also be performed during request processing 204, while building an impact model 206, and while checking for dirty data (at block 210).

The synchronous and asynchronous processes may occur in this context as well. For example, the determine-contact-check-initiate process may be a separate process from the elaborate-provide process and the elaborate-determine process. In these examples, the determine-contact-check-initiate process can be performed in a synchronous or asynchronous implementation, without diverting from the scope of the disclosure.

As part of the coordination function 108, a resource manger 110 in each of the geographies may be used to coordinate resources, consistent with the described examples. In some examples, the orchestration cluster node system may also use local infrastructure 116, in a given geography, to execute the process plan 214. For example, a request processing solution may associate services with the LoR. The LoR may refer to the geographical location that owns the up-to-date conductor record for a service within and/or spanning the LoR. In some examples, a service may span LoRs. Spanning may mean that parts of the service are present in and/or overlap different geographies. A coordination function at the LoR may ensure that one location at a time updates the service. If one location at a time updates the service, then the information in the LoR will be both up-to-date and accurate. Orchestrators at any given geography may autonomously process any requests pertaining to services within their own LoRs. The orchestrators need not coordinate with orchestrators at other geographies so long as the services processed are all services with the LoR of the orchestration. This may ensure the LoR for the location is accurate and up-to-date with respect to services within the LoR. However, in some instances an LoR for a service may be changed. This may involve full synchronization. Coordination with orchestrators in other geographies may be involved to change an LoR to ensure LoR information remains accurate and up-to-date. However, instances where a change in LoR is involved are rare. Because these instances are rare, even though a change to an LoR may involve more resources, time, and other performance demands, these types of transactions do not make up the majority of the transactions in a system. A majority of transactions may still occur at low latency, as they do not involve this type of coordination. Because a few rare transactions involve this type of coordination, latency can still be kept low without comprising transactional integrity.

As shown in FIG. 2, detailed components of first geography 102 are provided. These components may be present in any of the geographies described herein.

Figure 3:
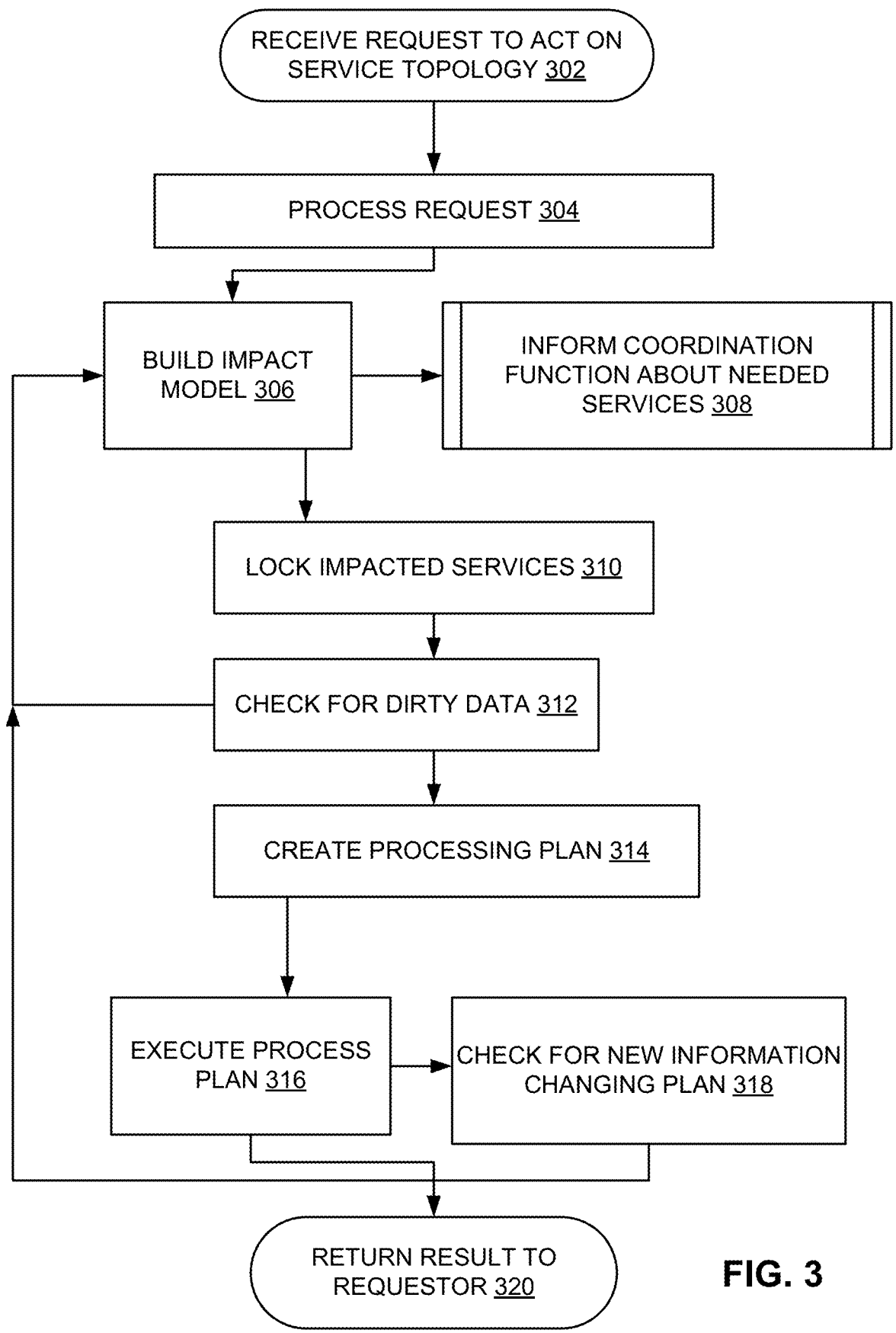
FIG. 3 is a flow diagram illustrating an example of a request processing method, in accordance with the examples disclosed herein.

FIG. 3 shows a flow diagram illustrating an example of a request processing method in accordance with the systems and methods described herein. In this illustration, orchestration cluster node system illustrated in FIG. 1 may execute one or more machine readable instructions to perform the operations provided herein.

At block 302, a request to act on a service topology may be received. The request to act on a service topology may be a request to create, modify, or delete a service topology. Other types of requests may also be possible. With the request, a graph of interrelated services may also be received. Both the request and the graph may be analyzed. A local service inventory replica may provide low-latency access.

At block 304, the orchestration cluster node system may proceed to process the received request. For example, the processing may be based on an optimistic read (e.g., optimistic access) of data. Optimistic locking may or may not be implemented as part of this initial analysis for processing a request. Optimistic, as used here, may indicate locking or reads based on the assumption that no other process touches the services. In other words, an engine may confirm whether and how requests were modified, created, and/or deleted with certainty after applying locks. If other processes touched a request, the work may be repeated with updated data. In other words, the transaction proceeds without restriction. The transaction proceeds even though in a rare case, the received data may be out of date. The system may implement coordination and data may be out of date.

At block 306, the orchestration cluster node system may build an impact model. The impact model may be built based on an optimistic read of data. The impact model may represent added, deleted, or modified services based on optimistic reads of requests. The processing time to generate the impact model may increase in relation to the number of requests involved in the impact model (e.g., increasing by seconds, minutes, or hours with respect to the number of requests).

At block 308, the orchestration cluster node system may inform the coordination function about the services it will modify. The operation performed with block 308 may be implemented after block 306 or concurrently with block 306. The coordination function may begin to locate each LoR affected, check for modifications, and ensure synchronization of the state in each local service inventory relative to a respective, affected LoR. The coordination function may proceed based on an optimistic read of data.

The orchestration cluster node system may complete the impact model. Once the orchestration cluster node system completes the impact model, the full set of services may be stored with service inventory replica 114 of FIG. 1 and queried by one or more components of orchestration cluster node system (e.g., resource manager 110 of FIG. 1). The orchestration cluster node system may activate the coordination function 108 of FIG. 1. The LoRs may already be cached, as discussed herein.

At block 310, the affected services may be locked for an update. For example, coordination function 108 may query the stored data to determine that each service to be modified is currently locked for update. Any services not currently locked may be locked as a result of the query from coordination function 108.

In some examples, another process may previously issue a lock on one or more services identified to be locked for update in the current update cycle. The other process may be local or may be in another geography.

In this situation, the orchestration cluster node system may wait for the locks to be released before proceeding or proceed anyway. When the orchestration cluster node system waits for the lock to be released, a deadlock may occur. A deadlock refers to processes on overlapping services and/or child services that attempt to access the same service. If a deadlock occurs, the coordination function (e.g., coordination function 108 of FIG. 1) may allow the oldest request to proceed first, for example, by preempting one or more locks by other requests so that the oldest request can proceed. When the oldest request is finished and the preempted locks are released, affected requests may be notified about the locks that were preempted. Data can then be read again by the remaining processes across all geographies, following the release of the locks.

At block 312, once the locks have been acquired, the orchestration cluster node system may check to see if any of the timestamps corresponding with optimistically read data also correspond with dirty data. The data may become dirty data relative to the now synchronized inventory data stored in the service inventory replica. Synchronized inventory data may refer to the data read following the release of locks, across all geographies. Reading this data may maintain transactional integrity. For instance, the orchestration cluster node system may have previously read a timestamp that is now inaccurate or incomplete relative to the synchronized data. If any dirty data is detected, the impact model may be re-run (e.g., corresponding with block 304). In some examples, the impact model may be re-run multiple times if dirty data is detected multiple times. However, each re-run of the impact model may generate more locks. Therefore, the re-run process may terminate as the number of locks continue to increase and a threshold number of locks that can be held is exceeded.

At block 314, upon correction of the identified dirty data or if no dirty data is detected, the orchestration cluster node system may create a process plan, as illustrated in FIG. 2 at block 212.

At block 316, the orchestration cluster node system may execute the process plan (e.g., including orchestration activations, etc.) using the resource manager (e.g., resource manager 110 of FIG. 1). The resource manager may maintain low-level synchronization by delegating actions for services to their respective geographies. In an example, request executor 106 of FIG. 1 may receive information that changes the process plan while executing actions.

At block 318, the orchestration cluster node system may check for receipt of new information. This process may run concurrently, in parallel, synchronously, asynchronously, or sequentially with the block 316. If orchestration cluster node system receives information warranting a change of process plan, a new impact model may be generated (e.g., as described with block 304). If orchestration cluster node system does not receive new information affecting the process plan, the resulting service data or functions may be generated.

At block 320, the orchestration result (e.g., resulting service data or functions) may be returned to the requestor.

Tree-Structured Locking Example

In some examples, the orchestration cluster node system takes an optimistic approach to predict which services it will modify in advance before obtaining synchronized data (e.g., to confirm transactional integrity). However, large topologies may involve many service requests (e.g., thousands or millions). High numbers of involved services may increase coordination requests, which may create a bottleneck and delay execution. This delayed execution limits scalability as the number of involved services increases. Leveraging a tree-structured locking process, as described herein, may achieve scalability in the orchestration cluster node system by reducing the bottleneck created by generating, tracking, and transmitting many services requests in the system.

In some examples, services may be structured in a number of hierarchies. The orchestration cluster node system may lock a service at a selected level in the hierarchy. When a service is locked, child services may also be locked. In some examples, all child services of the locked service, occupying levels below the locked service, may also be locked. This concept was illustrated in FIG. 2 between blocks 208 and 226, where several services may be locked automatically with a single locking command. Another process may not be able to lock a parent service. Therefore, another process cannot lock a service at higher level in the hierarchy if a service in the same family in a lower level of the hierarchy is already locked.

In some examples, a sibling service can be locked independently. Sibling services refer to services at the same level in a hierarchy and sharing, directly or indirectly, a parent service at a higher level in the hierarchy. In some examples, a service at the same level in the hierarchy as the already locked service may also be locked independently. In this way, two different processes may proceed independently and concurrently on two different parts of the service without interfering with each other.

The tree-structured locking process may be implemented with the orchestration cluster node system or other distributed environment. In some examples, when the tree-structured locking process is expanded, the LoR identifier or corresponding geography location may not be the same value for all child services in the service tree. Therefore, an additional constraint may be implemented to help ensure coordination in the distributed environment. After a threshold depth of the hierarchical tree implemented with the tree-structured locking process, the LoR may be fixed to a predetermined value. This may help achieve coordination with transactional integrity. The threshold depth may be configurable. In some examples, the LoR identifier or corresponding geography location may be fixed and no longer allowed to change past the threshold depth.

Figure 4:
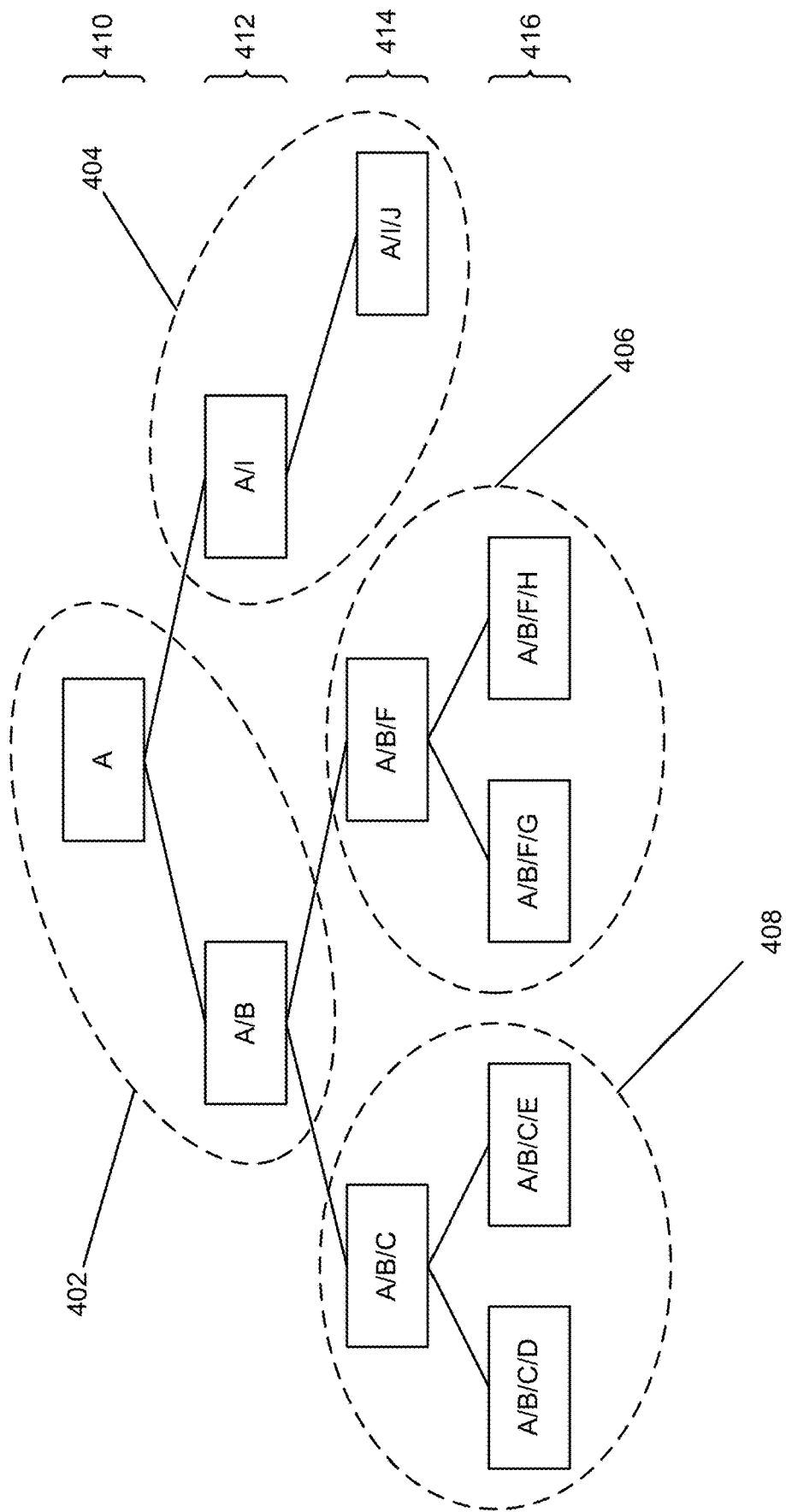
FIG. 4 is a diagram showing an example of a tree-structured locking process implemented by one or more components of the orchestration cluster node system, in accordance with the examples disclosed herein.

FIG. 4 is a diagram showing an example of a tree-structured locking process implemented by one or more components of the orchestration cluster node system, in accordance with the examples disclosed herein. In this illustration, the hierarchy includes four levels 410, 412, 414, and 416. The first level 410 includes service A. The second level 412 includes services A/B and A/I. The third level 414 includes services A/B/C, A/B/F, and A/I/J. The fourth level 416 includes services A/B/C/D, A/B/C/E, A/B/F/G, and A/B/F/H.

In some examples, the orchestration cluster node executor or service request executor 106 of FIG. 1 (referred to interchangeably as an "orchestrator") may lock a service within the hierarchy. The locked service may occupy a particular level. For example, orchestrator may lock service A/B/C in level three 414 of the hierarchy. When an orchestrator locks a service such as A/B/C occupying a level, all child services of the locked service may also be automatically locked. Therefore, if the orchestrator locks service A/B/C occupying level three 414, services A/B/C/D and A/B/C/E, occupying level four 416, may also be locked because services A/B/C/D and A/B/C/E are child services of service A/B/C of level three 414. A single locking command performed by the orchestrator may lock many services. For instance, a single locking command may lock services A/B/C, A/B/C/D, and A/B/C/E, as described herein.

In some examples, tree-structured locking process may not lock a parent operation to an already locked service. In other words, another process may not lock a service at a higher level of the service tree if a service in the same family in a lower level of the service tree is already locked. As illustrated in FIG. 4, if service A/B/C, occupying level three 414 is already locked, another process cannot lock service A/B, occupying level two 412 or service A, occupying level one 410. A/B and A are both parent services of service A/B/C, the locked service.

In some examples, tree-structured locking process may lock a sibling service on the same level of the service tree as a locked service (e.g., level three 414). For example, if an orchestrator locks service A/B/C, occupying level three 414 of the service tree, another process may lock service A/B/F, also occupying level three 414 of the service tree. Services A/B/C and A/B/F share a parent service, service A/B, occupying a second level 412 of the service tree. Therefore, services A/B/C and A/B/F are sibling services.

In some examples, tree-structured locking process may automatically lock processes within a service region. For example, if service A/B/C is locked, services A/B/C/D and A/B/C/E may also be locked, as these services are child services of service A/B/C. Therefore, services within a service tree within a region 408 are locked automatically. Sibling services of A/B/C may also be locked by independent processes. Therefore, services within a region 406 may be locked. This region 406 includes services A/B/F, A/B/F/G, and A/B/F/H. Parent services of A/B/C may not be locked by an independent process. Therefore, services within the tree in region 402 may not be locked. The region 402 includes services A/B, which is a direct parent of A/B/C, and service A, which is an indirect parent of A/B/C. A service in region 404 may also be locked by an independent process. Region 404 includes services A/I and A/I/J. Neither of these services are parent services of any locked services, so processes may lock these independently. However, A/I/J is a child service of NI, so if a process locks A/I/J, A/I may not be locked.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

EXAMPLE METHODS

Figure 5:
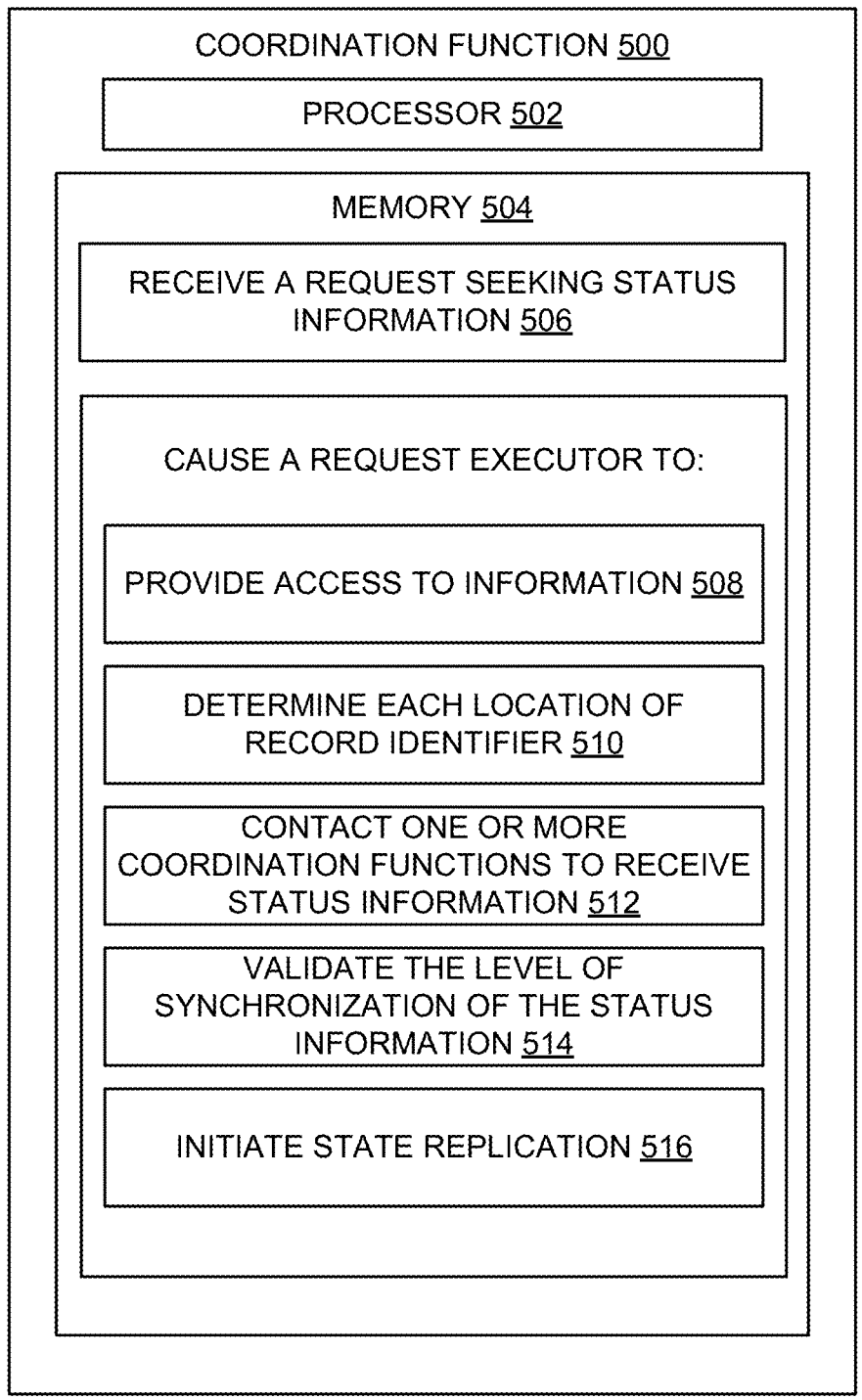
FIG. 5 is an example coordination function incorporating components of the cluster node system, in accordance with the examples disclosed herein.

FIG. 5 illustrates an example coordination function 500 in accordance with the examples described herein. Coordination function 500 may comprise one or more processors 502. Hardware processor 502 may be one or more central processing units (CPUs), semiconductor-based microprocessors, and/or other hardware devices suitable for retrieval and execution of instructions stored in main memory 504. Processor 502 may fetch, decode, and execute instructions, including instructions to control request processing, as described with reference to FIGS. 2 and 3.

Memory 504 communicably coupled to processor 502 to cause processor 502 to execute instructions 506-516. Memory 504 may comprise random access memory (RAM), a cache and/or other dynamic storage devices. Memory 504 also may be used for storing temporary variables or other intermediate information during execution of instructions to be executed by processor 502.

At block 506, coordination function 500 can receive a request from a request executor seeking status information about services affected by a request to modify a service topology. As described herein, the federated orchestration model comprising coordination function 500 may help execute services or other processes by one or more orchestration cluster nodes while executing requests, services, or orchestration processes with a low latency between a processor and a database corresponding to the processor. Coordination function 500 may execute requests, services, or orchestration processes at a low latency between the processor and the database corresponding to the processor.

At block 508, coordination function can cause a request executor containing the coordination function to provide access to information by storing a local copy in a local service inventory replica. As described herein, a service inventory replica (e.g. service inventory replica 114) may provide low latency database access by storing a local copy of the list of services. A list of services stored at the service inventory replica may help provide access to the list of services for other components of an orchestration cluster node system. In some examples, the list of services may be copied from a central database (e.g., located at another geography of the orchestration cluster node system).

At block 510, the request executor can determine each LoR identifier corresponding with services affected by the request to modify a service topology, each service in the service topology having an LoR identifier. As described herein, the LoR may refer to the geographical location that owns the up-to-date conductor record for a service within and/or spanning the LoR. In some examples, a service may span multiple LoRs.

At block 512, the request executor can contact one or more coordination functions located in other geographies to receive up-to-date versions of status information for services at geographies corresponding to each LoR identifier of each service. As described herein, a coordination function at the LoR may ensure that one location at a time updates the service. If one location at a time updates the service, then the information in the LoR will be both up-to-date and accurate. Orchestrators at any given geography may autonomously process any requests pertaining to services within their own LoRs. The orchestrators need not coordinate with orchestrators at other geographies so long as the services processed are all services with the LoR of the orchestration. This may ensure the LoR for the location is accurate and up-to-date with respect to services within the LoR.

At block 514, the request executor can validate the level of synchronization of the status information for each service by checking the local service inventory replica for each of the geographies corresponding to an affected service. As described herein, orchestration activations can be executed to maintain low level synchronization by delegating actions for services to their respective LoRs. The coordination function may begin to locate each LoR affected, check for modifications, and ensure synchronization of the state in each local service inventory relative to a respective, affected LoR. The coordination function may proceed based on an optimistic read of data.

At block 516, the request executor can initiate state replication of the local service inventory replica. Ensuring a replica state may involve confirming that service inventory replicas in different geographies have correct and up-to-date information. The service inventory replica may also be confirmed during request processing, while building an impact model, and while checking for dirty data.

Figure 6:
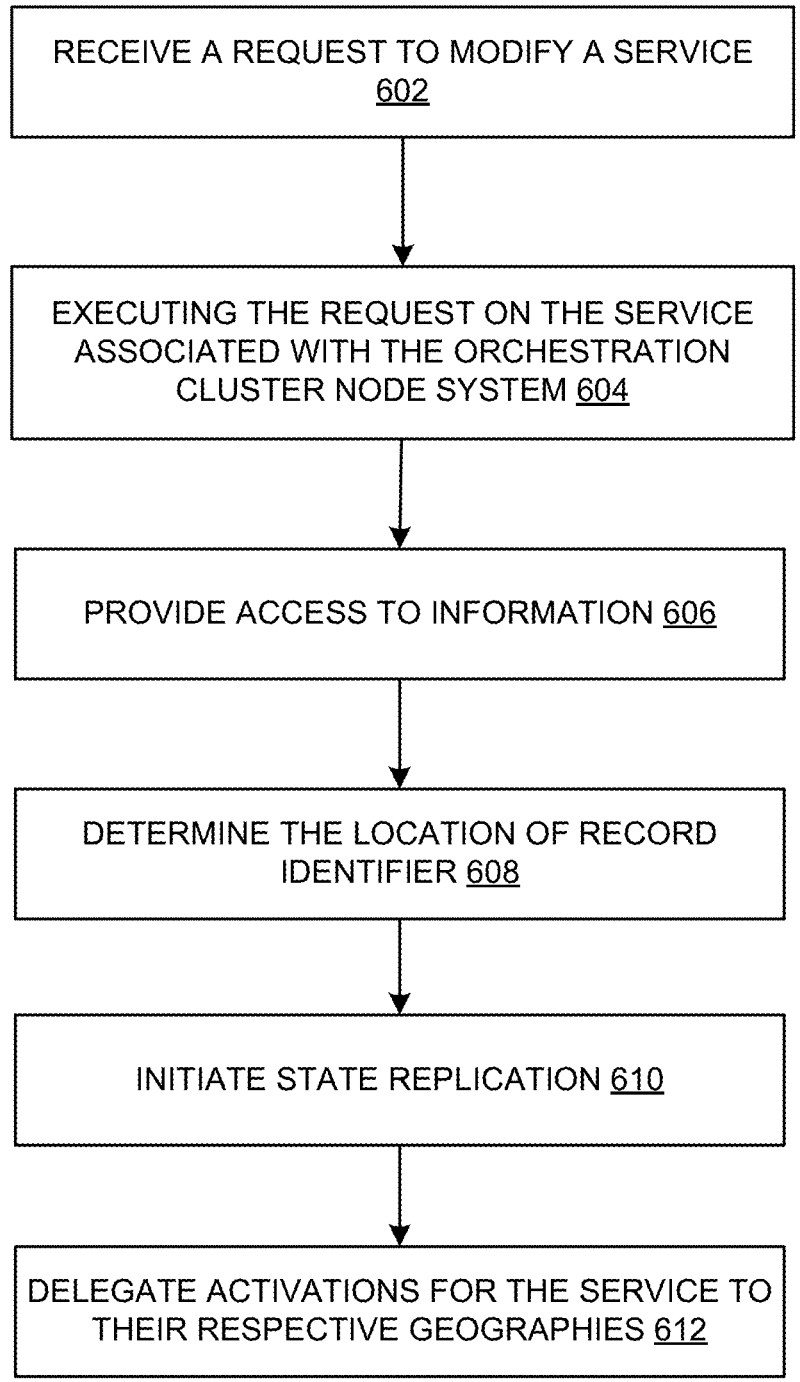
FIG. 6 is an example method incorporating the examples disclosed herein.

FIG. 6 illustrates an additional method 600 for implementing a coordination function. At block 602, the system can receive a request to modify a service as described herein with block 506. At block 604, the system can executing the request on the service associated with the orchestration cluster node system, wherein the service is associated with a LoR identifier, and wherein the service is located at one of a plurality of local orchestration cluster nodes. As described herein, the orchestration cluster node system may execute requests, services, or orchestration processes at a low latency between the processor and the database corresponding to the processor. Each orchestration cluster node may run in a container, a virtual machine, or on a physical server. The latency between the processor and corresponding database may be low.

At block 606, the system can provide access to information by storing a local copy in a local service inventory replica, as described herein in block 508. At block 608, the system can determine each LoR identifier corresponding with services affected by the request to modify a service topology, each service in the service topology having an LoR identifier, as described herein in block 510. At block

610, the system can initiate state replication of the local service inventory replica as described herein in block 516.

At block 612, the system can delegate activations for the service to their respective geographies, wherein the coordination functions of local orchestration cluster codes communicate to coordinate execution of the coordination functions across the geographies. As described herein, if no dirty data is found, the orchestration process may be executed by delegating actions for services in respective LoRs.

Example Computing Components and Implementations

Figure 7:
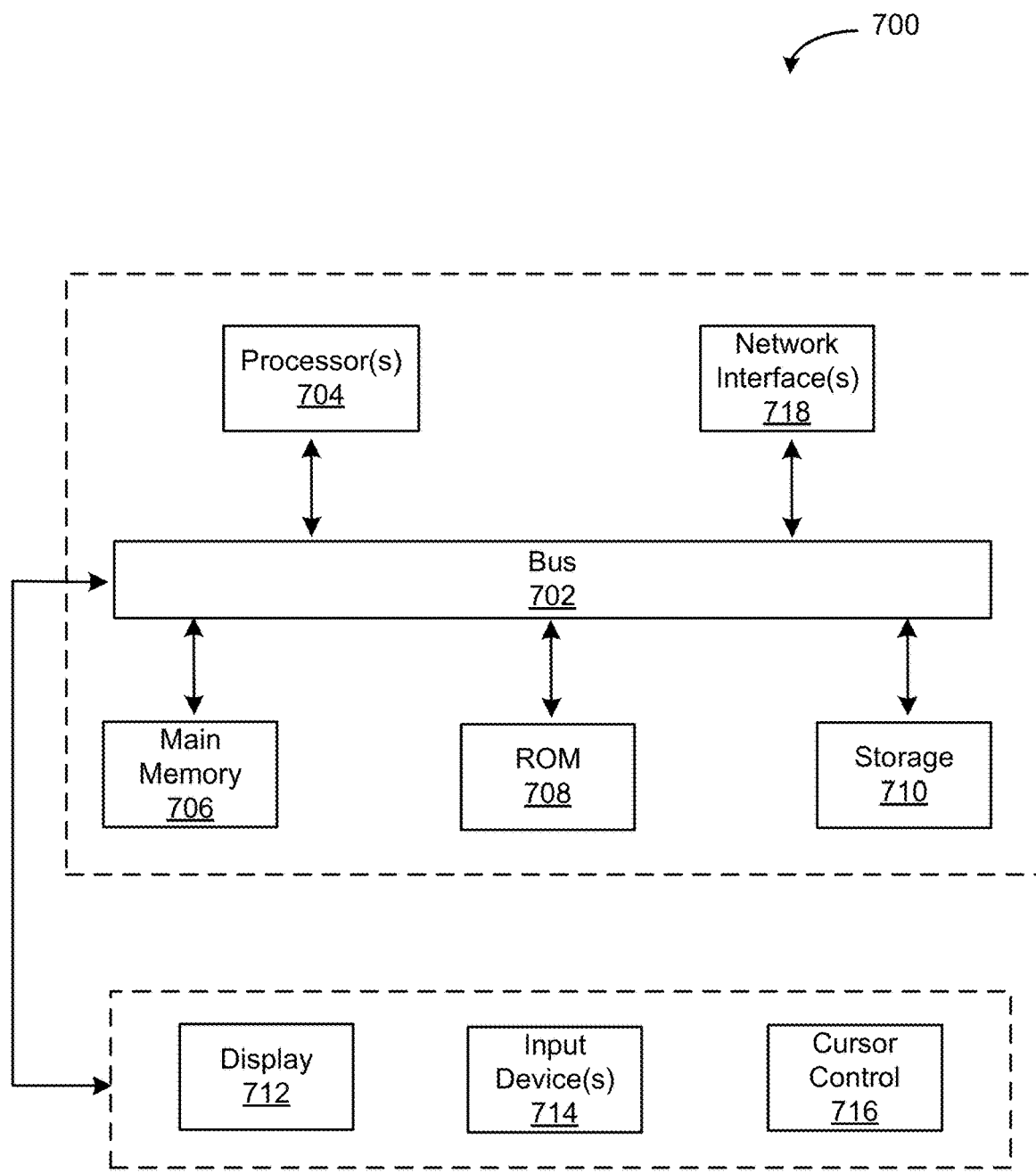
FIG. 7 is an example computer system that may be used to implement various features of examples described in the present disclosure.

FIG. 7 depicts a block diagram of an example computer system 700 in which various of the examples described herein may be implemented. The computer system 700 may be, for example, a server computer, a controller, or any other similar computing component capable of processing data. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

Hardware processor 704 may be one or more central processing units (CPUs), semiconductor-based microprocessors, and/or other hardware devices suitable for retrieval and execution of instructions stored in main memory 706. Processor 704 may fetch, decode, and execute instructions, including instructions to control request processing, as described with reference to FIGS. 2 and 3. As an alternative or in addition to retrieving and executing instructions, processor 704 may include one or more electronic circuits that include electronic components for performing the functionality of one or more instructions, such as a field programmable gate array (FPGA), application specific integrated circuit (ASIC), or other electronic circuits.

Main memory 706, may be any electronic, magnetic, optical, or other physical storage device that contains or stores executable instructions. Thus, main memory 706 may include, for example, Random Access Memory (RAM), non-volatile RAM (NVRAM), an Electrically Erasable Programmable Read-Only Memory (EEPROM), a storage device, an optical disc, and the like. In some examples, main memory 706 may be a non-transitory storage medium, where the term "non-transitory" does not encompass transitory propagating signals. Main memory 706 may be encoded with executable instructions, for example, instructions to control request processing, as described with reference to FIGS. 2 and 3.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a liquid crystal display (LCD) (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. In some examples, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that involves installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 700 may implement the techniques described herein using customized hard-wired logic, one or more ASICs or FPGAs, firmware and/or program logic which in combination with the computer system causes or programs computer system 700 to be a special-purpose machine. According to one example, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media can also take the form of acoustic or light waves, such as those generated during radio-wave and infra-red data communications.

The computer system 700 also includes a network interface 718 coupled to bus 702. Network interface 718 provides a two-way data communication coupling to one or more network links that are connected to one or more local networks. For example, network interface 718 may be an integrated services digital network (ISDN) card, cable modem, satellite modem, or a modem to provide a data communication connection to a corresponding type of telephone line. As another example, network interface 718 may be a local area network (LAN) card to provide a data communication connection to a compatible LAN (or WAN component to communicated with a WAN). Wireless links may also be implemented. In any such implementation, network interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 718, which carry the digital data to and from computer system 700, are example forms of transmission media.

The computer system 700 can send messages and receive data, including program code, through the network(s), network link and network interface 718. In the Internet example, a server might transmit a requested code for an application program through the Internet, the ISP, the local network and the network interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described herein may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example examples. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 700.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

The terms "substantially," "approximately," and "about" are used throughout this disclosure, including the claims, are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

What is claimed is:

1. A coordination function implemented by an orchestration cluster node system, the coordination function comprising:
   a processor; and
   a memory communicably coupled to the processor and storing instructions that, when executed by the processor, cause the processor to:
      receive a request from a request executor seeking status information about services affected by a request to modify a service topology;
      cause a request executor containing the coordination function to:
         provide access to information by storing a local copy in a local service inventory replica;
         determine each location of record (LoR) identifier corresponding with services affected by the request to modify a service topology, each service in the service topology having an LoR identifier;
         contact one or more coordination functions located in other geographies to receive up-to-date versions of status information for services at geographies corresponding to each LoR identifier of each service;
         validate a level of synchronization of the status information for each service by checking the local service inventory replica for each of the geographies corresponding to an affected service; and
         initiate state replication of the local service inventory replica; and
      after initiating the state replication, instruct the request executor to release locks on services identified for updating.

2. The coordination function implemented by the orchestration cluster node system of claim 1, wherein the instructions further cause the processor to coordinate locking of service records to ensure that only one process across all geographies modifies each service.

3. The coordination function implemented by the orchestration cluster node system of claim 1, wherein the instructions further cause the processor to indicate if there is a deadlock.

4. The coordination function implemented by the orchestration cluster node system of claim 1, wherein the instructions further cause the processor to implement a tree-structured locking process by:
   locking a parent service; and
   locking child services of the parent service, wherein implementing the tree-structured locking process avoids accessing other geographies by the coordination function.

5. The coordination function implemented by the orchestration cluster node system of claim 4, wherein the tree-structured locking process has a configuration that enables two processes to lock two sibling services, each process locking one sibling service, such that the two processes may proceed simultaneously.

6. The coordination function implemented by the orchestration cluster node system of claim 4, wherein the tree-structured locking process has a configuration that enables two processes to lock two non-sibling services, the two non-sibling services also not sharing the parent service, each process locking one of the two non-sibling services, such that the two processes may proceed simultaneously.

7. An orchestration cluster node system comprising:
   a plurality of local orchestration cluster nodes, each local cluster node comprising:
      a service request executor configured to:
         receive a request to modify a service, and
         execute the request on the service associated with the orchestration cluster node system, wherein the service is associated with a location of record (LoR) identifier, and wherein the service is located at one of the plurality of local orchestration cluster nodes;
      a coordination function configured to:
         provide access to information by storing a local copy in a local service inventory replica,
         determine the LoR identifier, and
         initiate state replication of the local service inventory replica; and
      a resource manager configured to:
         delegate activations for the service to their respective geographies, wherein the coordination functions of local orchestration cluster nodes communicate to coordinate execution of the coordination functions across the geographies,
   wherein the service request executor releases locks on services identified for update after the coordination function initiates the state replication.

8. The orchestration cluster node system of claim 7, wherein the coordination function is configured to determine the location of record (LoR) and initiate the state replication transparently and concurrently.

9. The orchestration cluster node system of claim 7, wherein each geography initiates multiple synchronizations concurrently towards multiple LoR.

10. The orchestration cluster node system of claim 7, further comprising:
    a resource manager configured to delegate activations for the service to their respective geographies, wherein the coordination functions of local orchestration cluster nodes communicate to coordinate execution of the coordination functions across the geographies.

11. The orchestration cluster node system of claim 7, wherein the local service inventory replica is configured to store a local copy of services executed at the geography for a consolidated and consistent view of the services in the local service inventory replica.

12. The orchestration cluster node system of claim 7, wherein the service request executor is further to:
    process the request using an optimistic locking process.

13. The orchestration cluster node system of claim 12, wherein an impact model is completed based on received status information about modifications to local services and to services spanning geographies.

14. The orchestration cluster node system of claim 12, wherein services included in an impact model are locked subject to confirmed modifications to the services.

15. A computer-implemented method comprising:
    receiving, by coordination function implemented by an orchestration cluster node system, a request from a request executor seeking status information about services affected by a request to modify a service topology;
    causing a request executor containing the coordination function to:
       provide access to information by storing a local copy in a local service inventory replica;
       determine each location of record (LoR) identifier corresponding with services affected by the request to modify a service topology, each service in the service topology having an LoR identifier;

contact one or more coordination functions located in other geographies to receive up-to-date versions of status information for services at geographies corresponding to each LoR identifier of each service;

validate a level of synchronization of the status information for each service by checking the local service inventory replica for each of the geographies corresponding to an affected service; and initiate state replication of the local service inventory replica; and after initiating the state replication, instructing the request executor to release locks on services identified for updating.

16. The computer-implemented method of claim 15, further comprising:

coordinating locking of service records, by the coordination function implemented by the orchestration cluster node system, to ensure that only one process across all geographies modifies each service.

17. The computer-implemented method of claim 15, further comprising:

indicating, by the coordination function implemented by the orchestration cluster node system, if there is a deadlock.

18. The computer-implemented method of claim 15, further comprising:

implementing, by the coordination function implemented by the orchestration cluster node system, a tree-structured locking process by:

locking a parent service; and locking child services of the parent service, wherein implementing the tree-structured locking process avoids accessing other geographies by the coordination function.

19. The computer-implemented method of claim 15, wherein an impact model is completed based on received status information about modifications to local services and to services spanning geographies.

20. The computer-implemented method of claim 15, wherein services included in an impact model are locked subject to confirmed modifications to the services.

* * * * *